May 23, 1961 R. L. HART ET AL 2,985,412
STORES LOADING OF WATER-BASED AIRCRAFT
Filed March 25, 1957 5 Sheets-Sheet 1
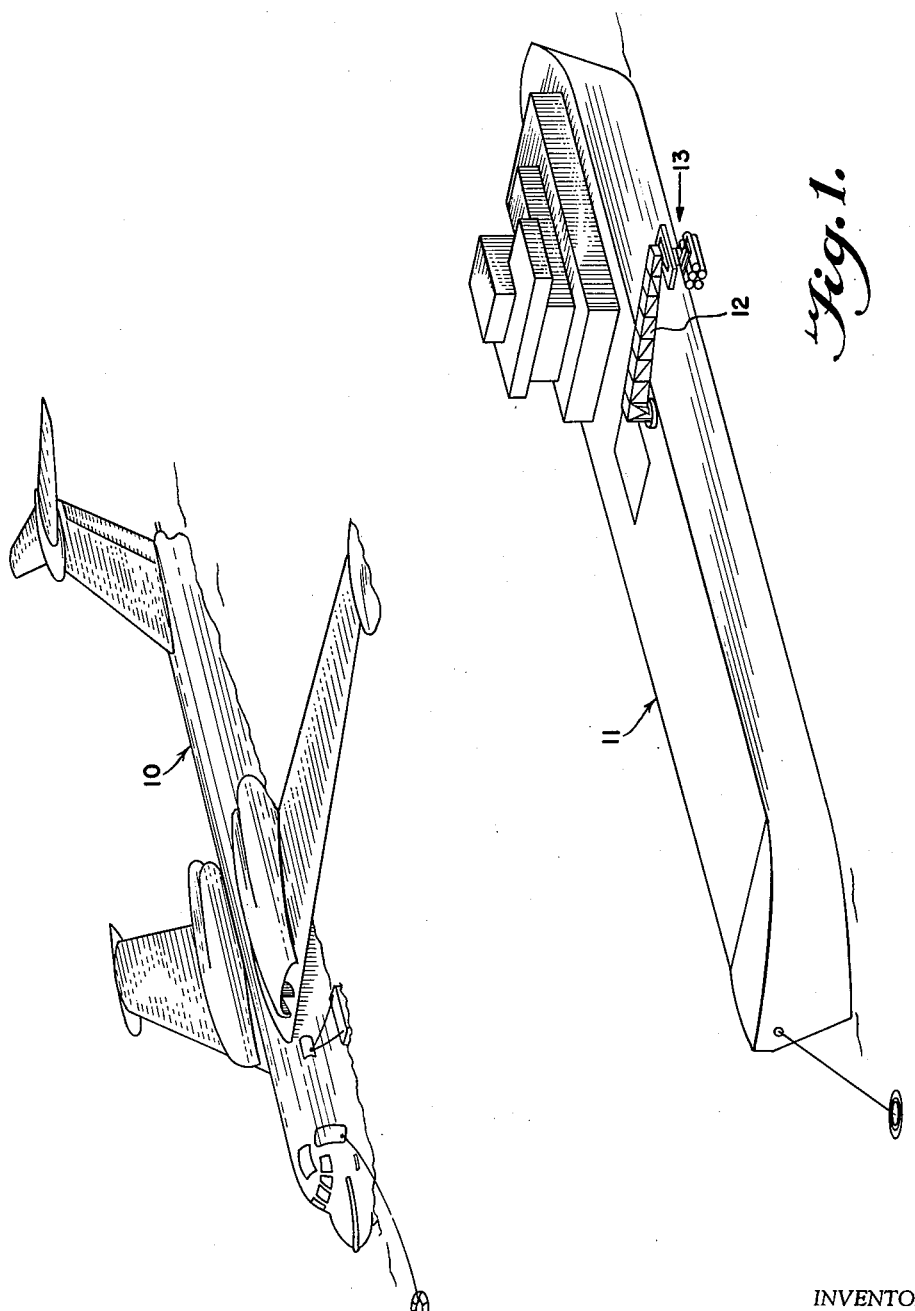
INVENTORS
ROBERT L. HART
DONALD K. MACKENZIE, JR.
FRANK J. WEBER
BY
ATTORNEY

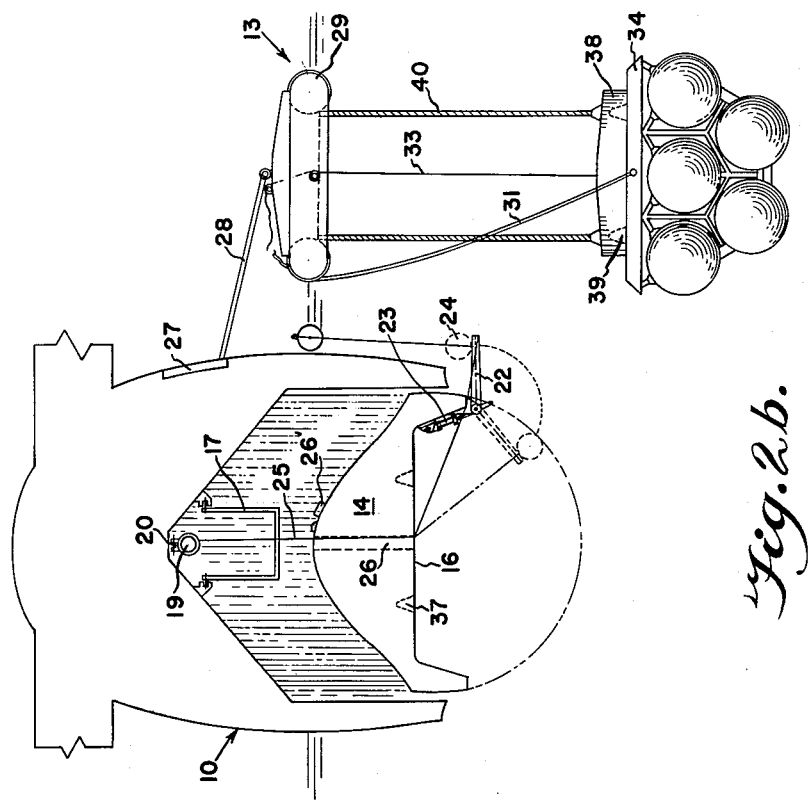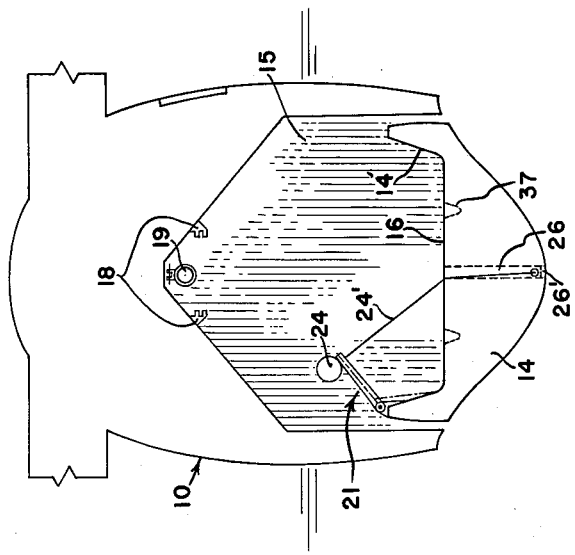

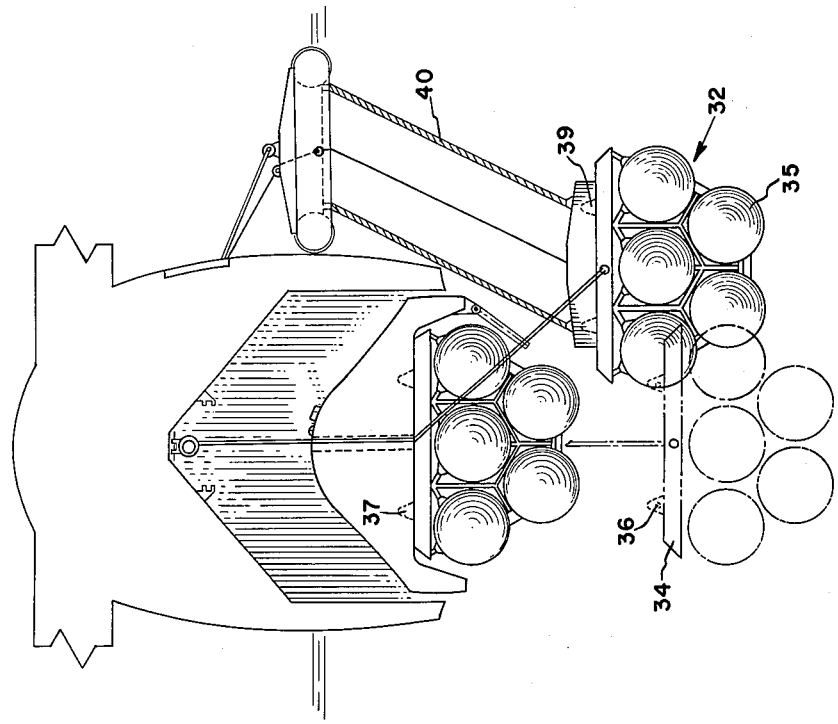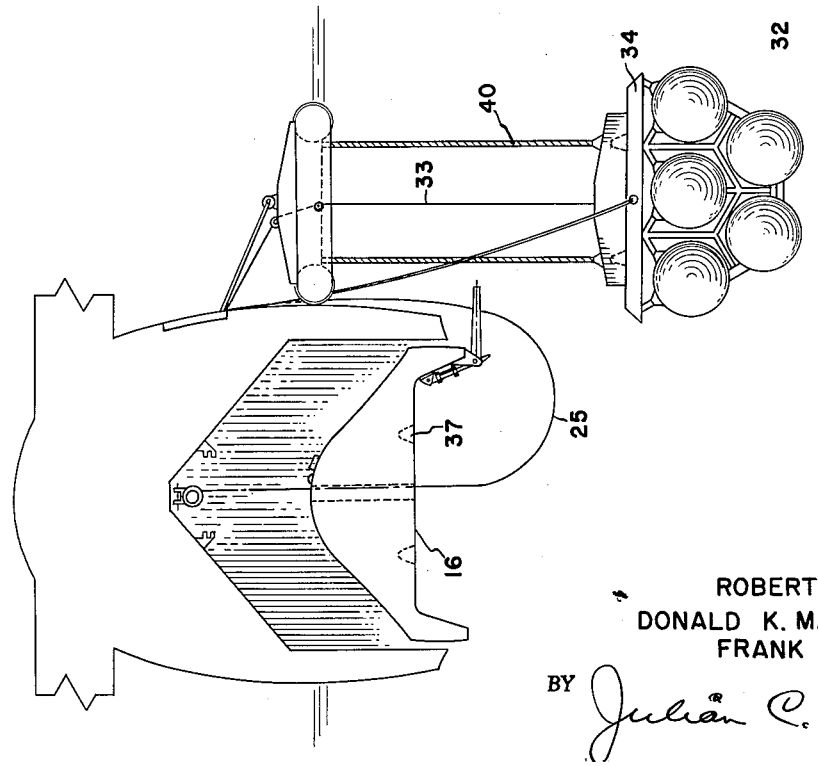

May 23, 1961 R. L. HART ET AL 2,985,412
STORES LOADING OF WATER-BASED AIRCRAFT
Filed March 25, 1957 5 Sheets-Sheet 4

INVENTORS
ROBERT L. HART
DONALD K. MACKENZIE, JR.
FRANK J. WEBER
BY Julian C. Renfro
ATTORNEY

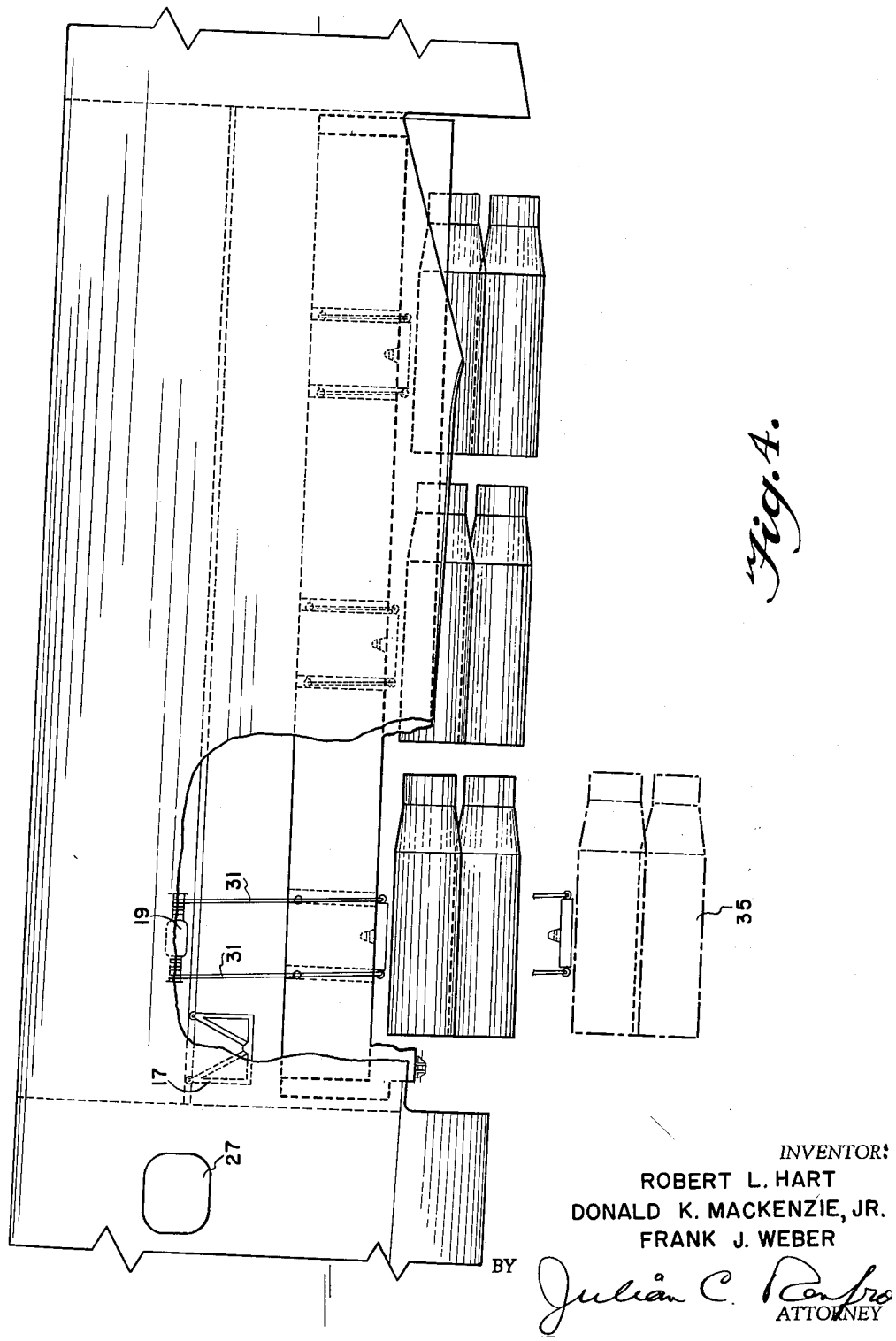

United States Patent Office 2,985,412
Patented May 23, 1961

2,985,412

STORES LOADING OF WATER-BASED AIRCRAFT

Robert L. Hart, Towson, Donald K. MacKenzie, Jr., Middle River, and Frank J. Weber, Baltimore, Md., assignors to The Martin Company, a corporation of Maryland Filed Mar. 25, 1957, Ser. No. 648,290

9 Claims. (Cl. 244—137)

This invention relates to the loading of stores into water-based aircraft and more particularly to an improved method and apparatus for loading stores into the hull of an aircraft at sea, according to which the presence of surface vessels is not required during the loading operation.

It is often desirable to load military stores such as munitions or the like into a water-based aircraft while the aircraft is at sea. The stores may be supplied from a surface ship, submarine or aircraft, and the aircraft to be rearmed lands in the vicinity of the stores and proceeds to transfer the stores to its mine bay. In the past, a number of proposals have been made with respect to the rearming of water-based aircraft at sea, one of which has been to provide the aircraft with doors in the crown of the aircraft to permit crown loading to take place. In this event, a crane is mounted in the aircraft which may be projected through the open crown doors to facilitate handling of the stores. This method of handling stores has been found to be very time-consuming and requires the utmost caution when loading in other than calm waters. Moreover, the crown doors and crane are carried as dead weight in flight.

The present invention provides a novel and substantially improved arrangement for the loading of military stores into water-based aircraft which effectively obviates the various disadvantages of prior art rearming methods. More specifically, the present invention provides a novel method of and apparatus for the loading of stores into the bottom of the hull of a water-based aircraft, in which the stores are transferred from a position suspended below a floating buoy to a position below the hull of the aircraft. The aircraft employs a rotary mine bay door generally of the type described and claimed in Woollens et al. Patent Number 2,634,656, and when the aircraft is stationary in the water, this door may be rotated to the inverted, weapon-receiving position. Then, upon the submerged weapon being moved into position on the door, the door can be reinverted to the flight position, and the aircraft commence its next mission.

In the copending application of Reinhold Barchet entitled, Underwater Loading of Stores into Water-Based Aircraft, filed September 17, 1956, Serial No. 610,325, and assigned to the assignee of the present invention, a method of and apparatus for the rearming of a water-based aircraft is described and claimed. In that invention, the aircraft is provided with a removable door in the bottom of its hull, which is exchanged for a loaded hull door when the aircraft is to be rearmed. In accordance with the present invention, it is not necessary to exchange hull doors, and since the weight transfer is therefore minimized, the possibility of damage to the aircraft during a rough seas loading is lessened. Also, the present rearming operation does not require the use of surface vessels.

Floating stores units are utilized according to the present invention, comprising palletized stores suspended below the surface of the water from a buoy or the like, the stores being located at a depth suitable for the transfer of the stores to the aircraft. The rotary mine door of the aircraft is provided with an aperture such as a hawse pipe extending therethrough so that a hoisting line may be passed through the inverted door and attached to a small float assembly located on the door. A float of the float assembly enables the end of the hoisting line to be carried to the surface of the water alongside the aircraft so that the hoisting line may be secured to the weapon cable of the floating stores unit by personnel working from a hatch in the side of the hull of the aircraft. When these lines have been secured together, the submerged stores can be drawn beneath the surface of the water by means of a hoist mounted in the mine bay of the aircraft to a position contacting the stores-carrying side of the door. Complementary fittings are located on the mine bay door and the pallet upon which the stores are mounted, so that upon the pallet being drawn by the hoist tightly against the inverted door, it automatically locks in position thereon. If the door is designed to receive a plurality of stores units, other stores may now be loaded by a similar procedure. When loading is complete, the door may be reinverted to the upright position, the water in mine bay area pumped overboard, and the aircraft taxied away from the buoy for takeoff.

For a better understanding of the invention, reference should be made to the following description and accompanying drawings in which:

Figure 1 is a simplified representation of a water-based aircraft and tending vessel, the tending vessel being shown placing a floating stores unit into the water;

Figure 3:
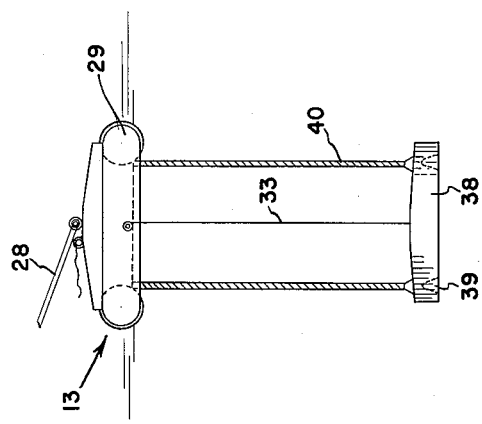
Figure 2E:
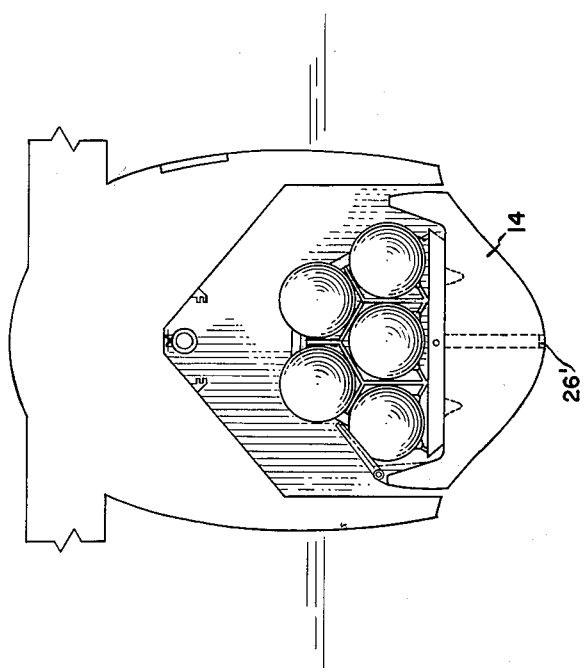
Figure 2a is an enlarged cross-sectional view taken through a typical section of the mine bay of the aircraft, illustrating the stores carrying door in the upright position.
Figure 2b is a cross-sectional view generally resembling Figure 2a but showing the stores carrying door in the inverted position and a floating stores unit alongside the aircraft.
Figure 2c is a similar cross-sectional view showing how the attachment procedure in which the hoisting line is connected to the weapon cable may be carried on from a hatch in the hull of the aircraft.

Figure 2d is a further cross-sectional view showing how the hoisting line of the aircraft has been employed for drawing the weapons suspended below the surface of the water to a position intermediate the buoy and the aircraft hull, this figure also indicating a position directly under the hull assumed by the stores when the stores have been released from the buoy, and the loaded position of the stores;

Figure 2e is a cross-sectional view taken after the stores have been secured to the door, and the door reinverted preparatory to the aircraft commencing its next mission;

Figure 3 is a view illustrating the buoy and the pallet-supporting member depending therefrom; and Figure 4 is a longitudinal cross-sectional view taken through a portion of the aircraft hull, revealing the placement of a plurality of banks of weapons in the mine bay.

In Figure 1, the numeral 10 designates a jet engine water-based aircraft in conjunction with which this invention may be employed. The aircraft 10 is shown alongside a tending vessel 11, this vessel being adapted to place in the water floating stores units 13 to be used for rearming the aircraft 10. To this end, a boom 12 or the like may be employed by the ship 11 for placing the floating stores units in the water in the proper manner. Although the ship 11 has been shown in proximity to the aircraft, it is to be understood that the presence of the ship or any other type of tender is not necessary to the rearming operation according to this invention, for the floating stores unit may remain in the water for an indefinite length of time before rendezvous with water-based aircraft.

As shown in Figure 2a, the aircraft 10 is equipped with a rotary mine bay door 14 forming the closure for the mine bay 15 of the aircraft. This door is rotatable when the aircraft is at rest in the water, either at the behest of the pilot, or another operator in the aircraft, and as previously mentioned, this door may be constructed generally along the lines of the Woollens et al. Patent Number 2,634,656, which is assigned to the assignee of the present invention.

A mounting surface 16 is provided on the side of the door remote from the side that is contoured to the hull of the aircraft, and a plurality of mounting recesses 37 are provided on this mounting surface to facilitate the securing of the stores to the door, as explained in greater detail hereinafter. A vertically disposed aperture such as a hawse pipe 26 extends through door 14, at the bottom end of which a removable cap 26' is located to prevent the undesirable ingress of water.

Mounted on one of the sloped inner sides 14' of the door 14 is a float assembly 21, which comprises float arm 22, float actuator 23 and float 24 carried adjacent the outer end of arm 22. See Figure 2b. Attached to float 24 is a float line 24' which extends through hawse pipe 26 and through a suitable fitting on arm 22 that permits float 24 to rise to the surface of the water when the arm has been moved to the extended position shown in full lines in Fig. 2b. The other end of the float line may be attached to the cap 26', so that upon the door 14 being inverted to the position shown in Figure 2b, the float line 24' will be available to be secured to hoisting line 25, to become an integral part thereof. The hoisting line 25 is contained upon hoist or winch 19, which, as hereinafter described, is employed to draw the stores into the mounting position on the aircraft.

As shown in Figure 2b, when door 14 has been rotated approximately 180° upon its longitudinal axis, mounting surface 16 of the door is placed in a downwardly-facing position in which it is adapted to receive a pallet 34 upon which may be mounted military stores such as mines, bombs or the like. Provision is made for pressuring the mine bay to a pressure of approximately 2 lbs. per square inch so as to maintain the level of the water in mine bay as low as possible. For the convenience of the crew or operating personnel of the aircraft, a personnel carrier 17 is provided which is movable along trackway 18 located along the top central portion of the mine bay. As shown in Figure 4, several banks of stores may be carried on the door 14 in tandem relation, and for that reason, the personnel carrier 17 as well as the hoist 19 may be slidable substantially the entire length of the mine bay, the hoist being mounted upon trackway 20.

Each stores unit 13 may comprise a buoy 29, suspended from which are cables 40 supporting pallet carrying member 38 upon which pallet 34 is removably mounted. See Figures 2b and 3. Also attached to the pallet 34 are weapons cables 31. For stability reasons, a plurality of cables 31 are preferably used in the manner to be observed in Figure 4 with each cable being arranged to be secured to a hoisting line 25 extending downwardly from double reel hoist 19. The use of two or more weapons cables per pallet, of course, necessitates the use of the same number of hawse pipes 26 in the corresponding portion of door 14, but in the interests of clarity, the stores loading procedure is described in terms of single hoisting lines, hawse pipes, etc. A weapon release line 33 is provided on each stores unit, by the operation of which slidable pins (not shown) employed to maintain the pallet 34 fastened to pallet carrying member 38 can be released at the proper time.

As best observed in Figure 2b, when the hawse pipe cover 26' has been removed from the inverted door, the float line 24' becomes available to be attached to hoisting line 25. When this has been accomplished, float arm actuator 23 can be actuated, causing the float arm 22 to move from the retracted, dotted line position to the full line position shown in Figure 2b. This causes the float 24 to become disposed outwardly beyond the side of the hull of the aircraft, so that upon the line 25 being sufficiently released, the float 24 can rise to the surface of the water, carrying with it the line 25. A crew member operating from hatch 27 can now by the use of a boat hook or the like obtain the free end of hoisting line 25, the other end of which is, of course, located upon hoist 19.

By similar use of the boat hook, the crew member secures the buoy mooring line 28 located on top of buoy 29 of floating stores unit 13. When the mooring line 28 has been made fast to the aircraft, the crew member can then proceed to pick up weapon cable 31 with a boat hook and to make the connection between hoisting line 25 and weapon cable 31 in the general manner shown in Fig. 2c. When cables 25 and 31 have been secured together in proper fashion, they may be both released to sink in the water preparatory to the energizing of the hoist 19. Operation of the hoist causes the weapons unit 32 to move through the water to a position intermediate the hull and the buoy 29, as shown in full lines in Figure 2d. Weapon release line 33 can now be pulled by crew member from hatch 27, causing the slidable pins (not shown) located in recesses 39 of pallet carrying member 38 to release mounting lugs 36, thereby allowing pallet 34 upon which the weapons 35 are mounted to swing in an arc until it is located directly below the door 14. The mounting surface 16 of door 14 is provided with complementary recesses 37 to receive lugs 36, and the lugs 36 are provided with eyelets that are automatically engaged by spring biased pins located in recesses 37 in door 14. The lug and recess arrangement is not only self-locking, but is also self-aligning, for upon hoist 19 being operated to draw pallet 34 firmly up against the mounting surface of door 14, the pallet is automatically guided by the sloping sides of lugs 36 and recesses 37 to the third position shown in Figure 2d, in which position it is automatically locked by the aforementioned pins. Upon this being accomplished, the float actuator 23 can be operated in the reverse direction so as to restore the float arm to the retracted position in which it rests adjacent the weapons 35.

When a plurality of stores-carrying pallets are to be loaded upon door 14, the foregoing stores loading procedure is essentially repeated each time. For doors of sufficient length to receive a plurality of banks of stores in the manner illustrated in Figure 4, a separate float assembly is used in conjunction with the hoisting lines of each bank. Only a single hatch 27 is necessary for the attachment to the respective weapons of the lines emanating from the door, for the several float assemblies employed on the door are located in closely spaced array (not shown) at the end of the door adjacent hatch 27. In this manner, the crew member at hatch 27 can, by the use of a boat hook, secure the floats associated with the various positions on the door in the order desired, and proceed to connect the weapon cables 31 of each successive floating stores unit to the lines associated with the portion of the door next to be loaded. When the desired loading of the door has been accomplished, the hoisting cables are disconnected from the last set of weapon cables, and the covers 26' reinserted in the hawse pipes. The door is now operated so as to rotate it 180° back to the position shown in Figure 2e. For watertightness, a mine door seal such as that described and claimed in the copending application of Gantschnigg and Buschers entitled "Seal," filed June 13, 1955, Serial No. 514,878, now U.S. Patent Number 2,792,599 may be employed. In the event such a seal is used, it may now be inflated and any water remaining in the mine bay 15 pumped out by suitable pumps (now shown). The weapon is readied for the mission by making the necessary electrical connections and casting off the buoy mooring lines 28.

The method according to this invention of transferring at sea military stores to a water-based aircraft is essentially as follows: A support ship, submarine or even another aircraft places one or more floating stores units in the water. The aircraft to be rearmed lands in the water and proceeds to taxi to a position adjacent the unit or units and picks up the mooring cables 28. About the same time, the rotary mine door 14 of the aircraft is rotated 180° to the inverted position, and the hawse pipe covers 26' are removed from the positions on the door onto which stores are to be loaded. This makes available to the crew inside the mine bay the float lines 24', and the crew then proceeds to move the hoist 19 to a position in the mine bay in which the first portion of the mine door can be loaded. The hoisting lines 25 are now secured to the float line 24' of this first door position. The float actuator 23 corresponding to this first door position can now be operated so that its float line can be carried to the surface of the water. A crew member operating from hatch 27 now secures this first float such as by the use of a boat hook, removes the float line therefrom, and then proceeds to connect the hoisting lines 25 to the weapon cables 31 of the first stores unit to be loaded aboard the aircraft. The hoist 19 can now be energized so as to draw the submerged stores toward the mine door, and at a proper moment, the weapon release line 33 is pulled by the man at hatch 27 to release pallet 34 from pallet carrying member 38 of the floating stores unit. This, of course, allows the loaded pallet to swing in the water to position directly below door 14. Further operation of hoist 19 causes the pallet 34 to be drawn tightly up against door 14, in which position it is automatically locked by the interaction of upstanding lugs on the pallet and spring loaded pins on the door. The mooring line 28 and release line 33 corresponding to the buoy of the unit now loaded can be cast off, and the mooring line of the next unit to be loaded utilized so as to draw it alongside the aircraft.

The hoist 19 is now moved along its trackway in the mine bay to a position corresponding to the second location on the door to be loaded. The crew then proceeds to secure hoisting lines 25 to the float line 24' of this position of the door, and when this has been accomplished, the float actuator 23 corresponding to this door position is actuated so as to carry the float line-hoist lines combination to the surface of the water for connection to the weapon cables of this second stores unit. In the previously described manner, the winch is now operated so as to bring about transfer of the second stores unit to the locked position on the door. This process is essentially repeated until the desired loading of all positions of the door has been accomplished. The hawse pipe covers 26' are now reinserted in their respective hawse pipes, the hoist and personnel carrier are moved to secured positions, and the door reinverted to the upright position so as to place the weapons inside the mine bay of the aircraft. The mine door seal is then inflated and any water remaining in the compartment is pumped out. The weapons are readied for the next mission upon the completion of the necessary mechanical and electrical connections.

The foregoing underwater loading technique can be carried out in 6 ft. waves with little difficulty, and inasmuch as the weight transferred to the aircraft is minimized, possible damage to the aircraft is lessened. The utilization of a minimum number of personnel is made possible, and this procedure and all of the operations connected therewith can be brought about from inside the aircraft without assistance from surface vessels.

The employment of this invention for the reloading of water-based aircraft can not only be accomplished in a minimum of time, but also it brings about the elimination of a considerable amount of weight represented by the large crown loading crane and crown doors utilized according to some prior art techniques. Also, since merely the stores and their pallet are being transferred, only a slight additional draft in addition to the draft normally required by the aircraft is necessitated.

It is to be realized that the practice of this invention need not be confined to use with a floating stores unit of the type described herein. As a possibility, the military stores to be loaded aboard a waterbased aircraft could be cached on the sea bottom or on a submersible vehicle or vessel. A suitable triggering arrangement would be provided to bring about release of one or more floats to bring weapon cables to the surface for joinder to the hoisting lines of the aircraft.

As another possibility, a single large buoy may be employed, having suspended therefrom a plurality of banks of stores. In such event, all positions of the door could be loaded after contact having been made with this buoy.

Various changes may be made in the details of construction without departing from the spirit of the invention, or sacrificing any of the advantages thereof.

We claim:

1. The method of transferring at sea stores suspended below a floating object to an aircraft having a rotatable stores carrying door in its hull which comprises the steps of moving the aircraft to a position in proximity to the stores, rotating said door to an inverted, stores-receiving position, passing through an aperture extending through said door a line to the surface of the water alongside the aircraft, securing said line to a cable attached to said stores, drawing said line and cable into said aircraft so as to pull the suspended stores toward said door, releasing the stores from said floating object, continuing to draw the stores against the door so as to lock the stores in place thereon, and reinverting said door so as to place said stores inside the aircraft.

2. The method of transferrng at sea palletized stores suspended below a floating buoy to an aircraft having a rotatable stores carrying door in its hull which comprises the steps of moving the aircraft to a position in proximity to the buoy, rotating said door to an inverted, stores-receiving position, passing through an aperture extending through said door a line to the surface of the water alongside the aircraft, securing said line to a cable attached to the pallet upon which the stores are mounted, drawing said line and cable into said aircraft so as to pull the suspended palletized stores toward said door, releasing the pallet from said buoy, continuing to draw the pallet against the door so as to lock it in place thereon, and reinverting said door so as to place said stores inside the aircraft.

3. The method of transferring at sea weapons suspended below floating buoys to an aircraft having a rotatable weapons carrying door in its hull which comprises rotating said door to an inverted, weapons-receiving position, passing a line through an aperture in the door to the water alongside said aircraft, moving a first buoy to a position alongside said aircraft and adjacent said line, securing said line to a cable attached to the weapon supported from said buoy, drawing said weapon toward a position below said door by the use of said line, releasing said weapon from said buoy, continuing to draw upon said line so as to pull said weapon up against said door for automatic locking thereto, moving successive buoys alongside said aircraft for similar transfer of their weapons to other positions on said door, and reinverting said door at the termination of the loading operations so as to place said weapons inside said aircraft.

4. A rotatable stores-carrying door for the weapons bay of a water-based aircraft, said door being equipped with at least one aperture extending therethrough, a float operably connected to said door having a float line attached thereto, with said line extending through said aperture, said float, when said door has been rotated to an inverted, stores-receiving position, being movable to a position in which it can rise to the surface of the water alongside said aircraft, said float facilitating the transfer of a line from said aperture to the surface of the water for attachment to a line extending from stores to be loaded upon said door.

5. Apparatus for transferring at sea military stores from a floating stores unit to an aircraft having a rotatable stores-carrying door in its hull, said floating stores unit comprising a buoy designed to float in the water, a pallet-carrying member suspended in the water below said buoy, and a pallet designed to carry stores thereon releasably secured to said pallet-carrying member, said rotatable stores-carrying door being equipped with at least one aperture extending therethrough, a float operably connected to said door having a float line attached thereto, with said line extending through said aperture, said float, when said door has been rotated to an inverted stores-receiving position, being movable to a position in which it can rise to the surface of the water alongside said aircraft, said float facilitating the transfer of a line from said aperture to the surface of the water for subsequent attachment to said pallet.

6. Apparatus for transferring at sea military stores from a floating stores unit to an aircraft having a rotatable stores carrying door in its hull, said floating stores unit comprising a buoy having suspended therefrom a pallet upon which are mounted stores, and a cable extending from said pallet so as to be accessible at the surface of the water, said aircraft having a rotatable door provided with an aperture extending therethrough, through which aperture a hoisting line may be passed to the surface of the water, means in said aircraft adapted to draw said line back through said aperture when said line has been secured to said cable extending from said pallet, whereby said pallet may be drawn to a position below said aircraft, and means for releasing said pallet from said buoy so that said pallet may be drawn by said previously mentioned means to a position in which it may be locked against said door.

7. The apparatus as defined in claim 6 in which a float assembly is provided to facilitate the transfer of said hoisting line to the surface of the water alongside said aircraft.

8. The apparatus as defined in claim 6 in which said pallet is releasably mounted upon a pallet-carrying member suspended in the water from said buoy.

9. The method of transferring at sea weapons suspended in a plurality of banks below a floating buoy to an aircraft having a rotatable weapons carrying door in its hull which comprises moving the aircraft to a position in proximity to the buoy, rotating said door to an inverted, weapons-receiving position, passing a line through a first aperture in the door to the water alongside said aircraft, securing said line to a cable attached to a first bank of weapons supported from said buoy, drawing said weapon toward a position below said door by the use of said line, releasing said weapon from said buoy, continuing to draw upon said line so as to pull said weapon up against said door for automatic locking thereto, repeating the procedure of passing a line through successive apertures in the door corresponding to other loading positions, and securing said line to the cables of successive banks of weapons so as to bring about sequential transfer of other weapons from said buoy to said door, and reinverting said door at the termination of the loading operations so as to place said weapons inside said aircraft.

References Cited in the file of this patent

UNITED STATES PATENTS

| Re. 20,379 | Henry | May 25, 1937 |
| 1,220,825 | Funga-Giera | Mar. 27, 1917 |
| 1,765,101 | Schierenbeck | June 17, 1930 |
| 1,773,029 | Cobham | Aug. 12, 1930 |
| 2,294,296 | Hansen | Aug. 25, 1942 |
| 2,381,394 | Beach | Aug. 7, 1945 |
| 2,634,656 | Woollens et al. | Apr. 14, 1953 |
| 2,650,558 | Nizery | Sept. 1, 1953 |
| 2,702,678 | Flock | Feb. 22, 1955 |
| 2,734,705 | Robertson | Feb. 14, 1956 |